US011130697B2

(12) United States Patent
Oh et al.

(10) Patent No.: US 11,130,697 B2
(45) Date of Patent: Sep. 28, 2021

(54) GLASS MANUFACTURING METHOD AND APPARATUS

(71) Applicant: Corning Incorporated, Corning, NY (US)

(72) Inventors: Myunghwan Oh, Yongin-si (KR); Sunmi Yoo, Asan-si (KR)

(73) Assignee: Corning Incorporated, Corning, NY (US)

( * ) Notice: Subject to any disclaimer, the term of this patent is extended or adjusted under 35 U.S.C. 154(b) by 165 days.

(21) Appl. No.: 16/302,943

(22) PCT Filed: May 23, 2017

(86) PCT No.: PCT/KR2017/005341
§ 371 (c)(1),
(2) Date: Nov. 19, 2018

(87) PCT Pub. No.: WO2017/204527
PCT Pub. Date: Nov. 30, 2017

(65) Prior Publication Data
US 2019/0144323 A1    May 16, 2019

(30) Foreign Application Priority Data
May 23, 2016 (KR) .................. 10-2016-0063047

(51) Int. Cl.
*C03B 17/06*    (2006.01)
*G01L 1/24*    (2006.01)
*G02F 1/1333*    (2006.01)

(52) U.S. Cl.
CPC .......... *C03B 17/067* (2013.01); *C03B 17/064* (2013.01); *G01L 1/24* (2013.01);
(Continued)

(58) Field of Classification Search
None
See application file for complete search history.

(56) References Cited

U.S. PATENT DOCUMENTS 6,219,131 B1   4/2001   Zhang et al.
7,685,840 B2   3/2010   Allaire et al.
(Continued)

FOREIGN PATENT DOCUMENTS

CN    101258214 A    9/2008
CN    101300197 A    11/2008
(Continued)

OTHER PUBLICATIONS

International Search Report and Written Opinion of the International Searching Authority; PCT/KR2017/005341; dated Aug. 30, 2017; 9 Pages; Korean Intellectual Property Office.
(Continued)

*Primary Examiner* — Queenie S Dehghan
(74) *Attorney, Agent, or Firm* — Matthew J. Mason

(57) ABSTRACT

A glass manufacturing method. A plurality of stress values in a glass sheet are determined in a plurality of locations of the glass sheet respectively. A plurality of light leakage degrees are determined in the plurality of locations of a polarization-based display provided with the glass sheet, when the polarization-based display is in a state to block light transmissions. The plurality of determined stress values are modified based on the plurality of determined light leakage degrees. At least one additional glass sheet is manufactured in a glass sheet manufacturing process with at least one process condition of the glass sheet manufacturing process being adjusted based on the plurality of modified stress values.

21 Claims, 6 Drawing Sheets

(52) U.S. Cl.
CPC ............ *G01L 1/241* (2013.01); *G02F 1/1333* (2013.01); *G02F 1/133302* (2021.01)

(56) References Cited

U.S. PATENT DOCUMENTS

| | | | |
|---|---|---|---|
| 9,010,148 | B2 | 4/2015 | Contreras et al. |
| 2007/0220920 | A1 | 9/2007 | Allaire et al. |
| 2012/0098959 | A1 | 4/2012 | Addington |
| 2012/0111055 | A1* | 5/2012 | Allan .................. C03B 17/064 65/29.18 |
| 2013/0074549 | A1 | 3/2013 | Ahrens et al. |
| 2013/0319047 | A1 | 12/2013 | Contreras et al. |
| 2016/0370654 | A1* | 12/2016 | You .................. G02F 1/133611 |
| 2018/0275435 | A1* | 9/2018 | Liu .................. G02F 1/133305 |

FOREIGN PATENT DOCUMENTS

| | | |
|---|---|---|
| CN | 102455545 A | 5/2012 |
| CN | 103011562 A | 4/2013 |
| CN | 103149742 A | 6/2013 |
| CN | 103154973 A | 6/2013 |
| CN | 104914609 A | 9/2015 |
| CN | 105164578 A | 12/2015 |
| JP | 2008-209906 A | 9/2008 |
| JP | 2009-531269 A | 9/2009 |
| JP | 2013-071888 A | 4/2013 |
| JP | 2015-519288 A | 7/2015 |
| TW | 200804206 A | 1/2008 |
| TW | 201613830 A | 4/2016 |

OTHER PUBLICATIONS

Taiwanese Patent Application No. 106116997, Search Report dated Apr. 6, 2021, 1 page (English Translation Only) Taiwanese Patent Office.

Japanese Patent Application No. 2018-561210 Office Action dated Mar. 24, 2021, 4 pages (2 pages of English Translation and 2 pages of Original Document); Japanese Patent Office.

Chinese Patent Application No. 201780031988.X, Office Action dated Jun. 10, 2021, 4 pages (English Translation Only), Chinese Patent Office.

* cited by examiner

[Fig. 1]
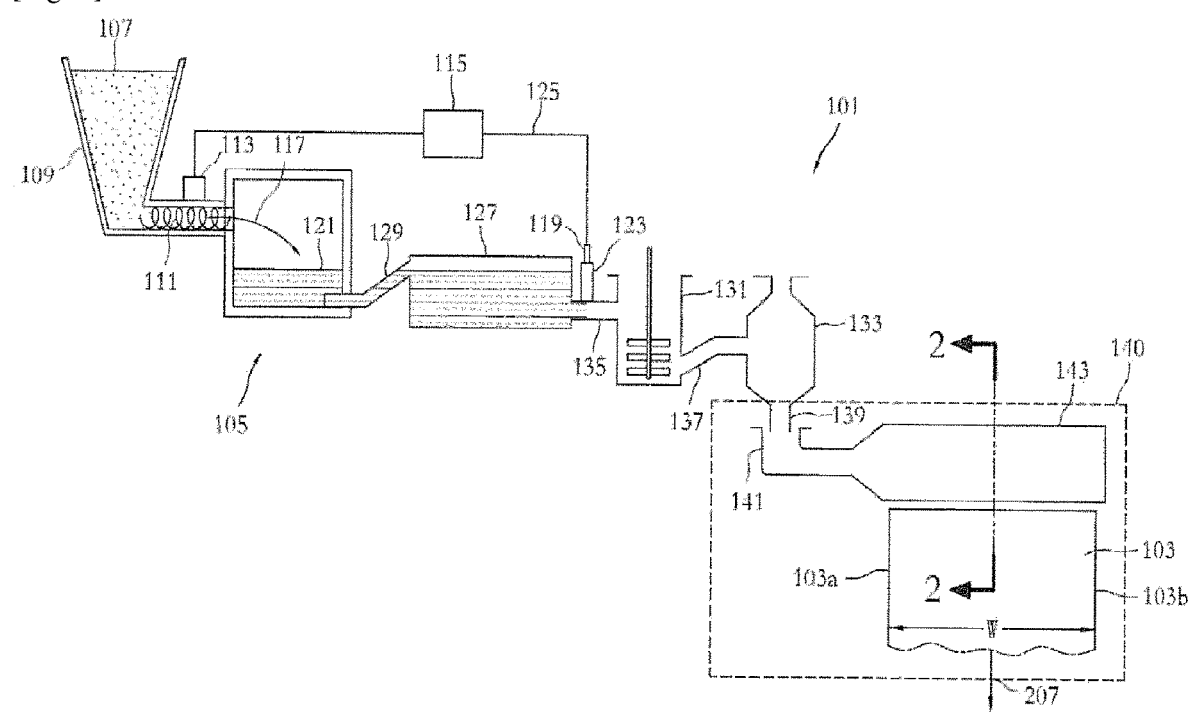

[Fig. 2]
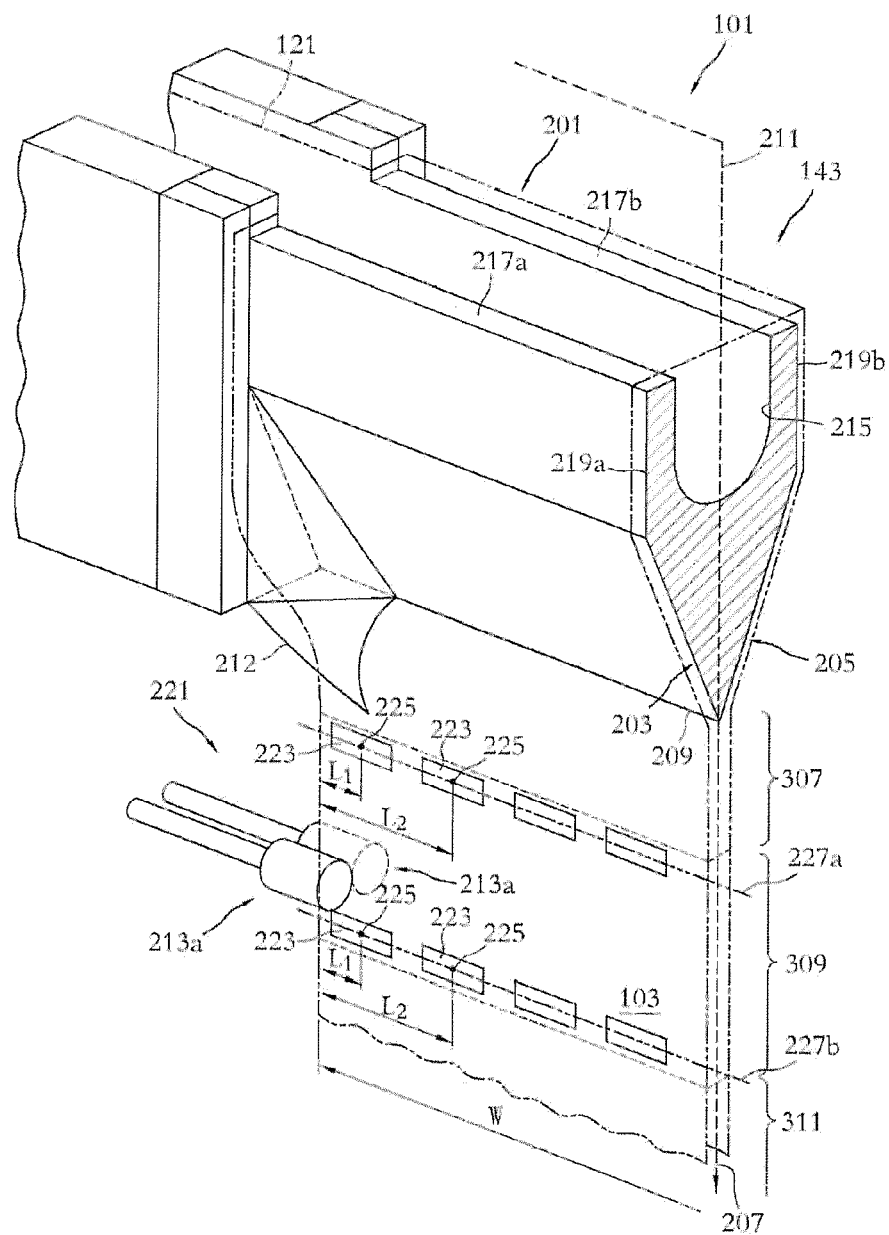

[Fig. 3]
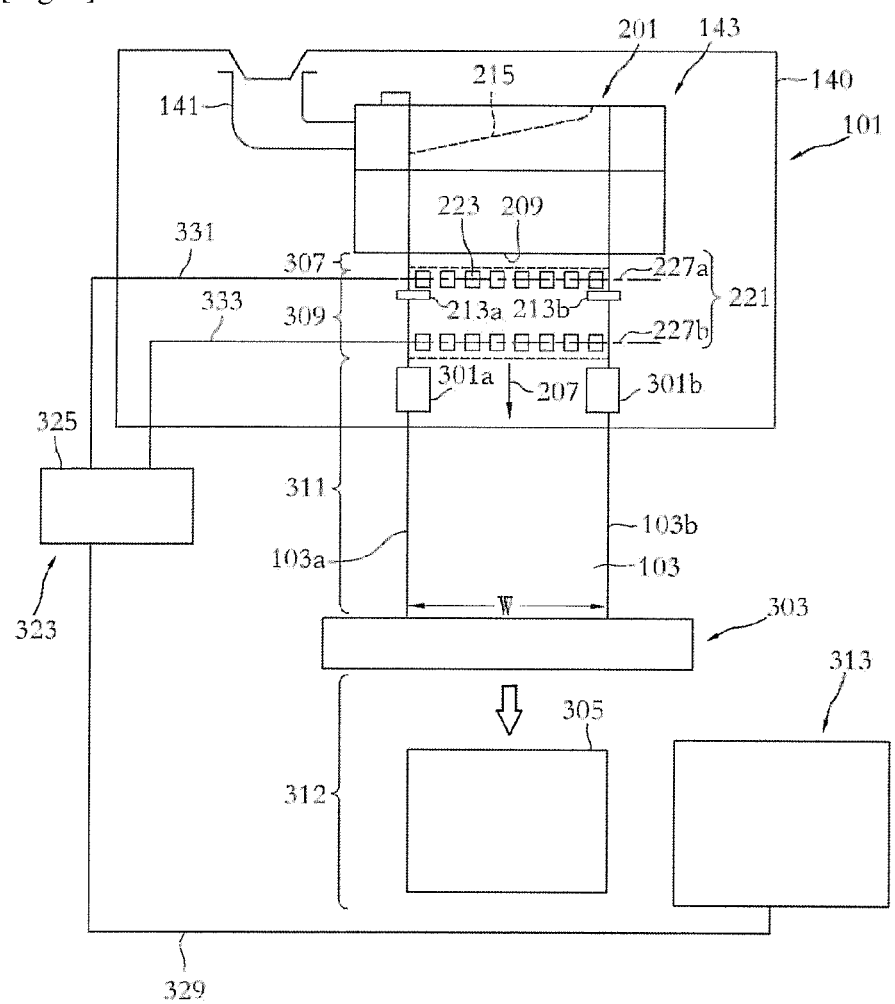

[Fig. 4]
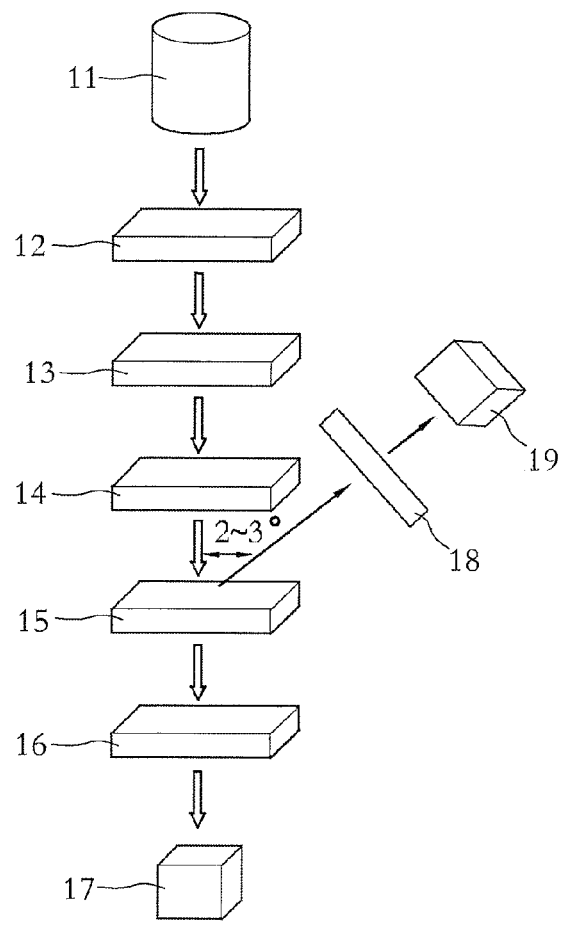
[Fig. 5]
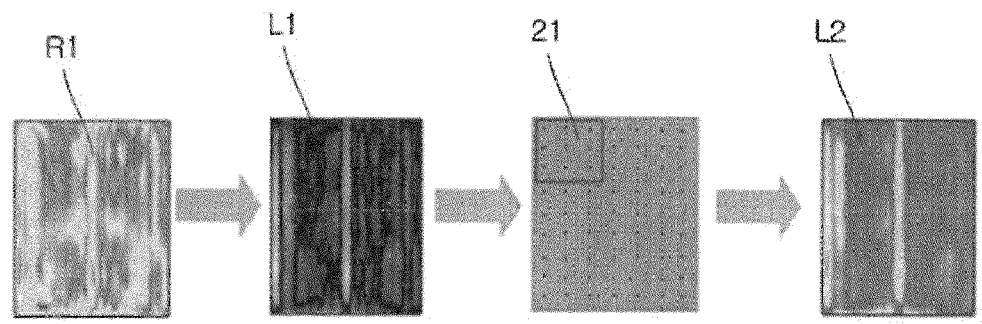

[Fig. 6]
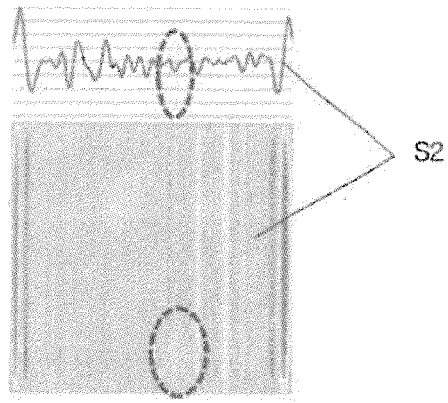
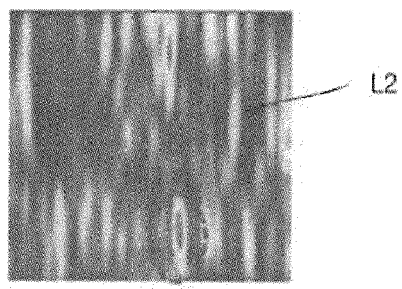
[Fig. 7]
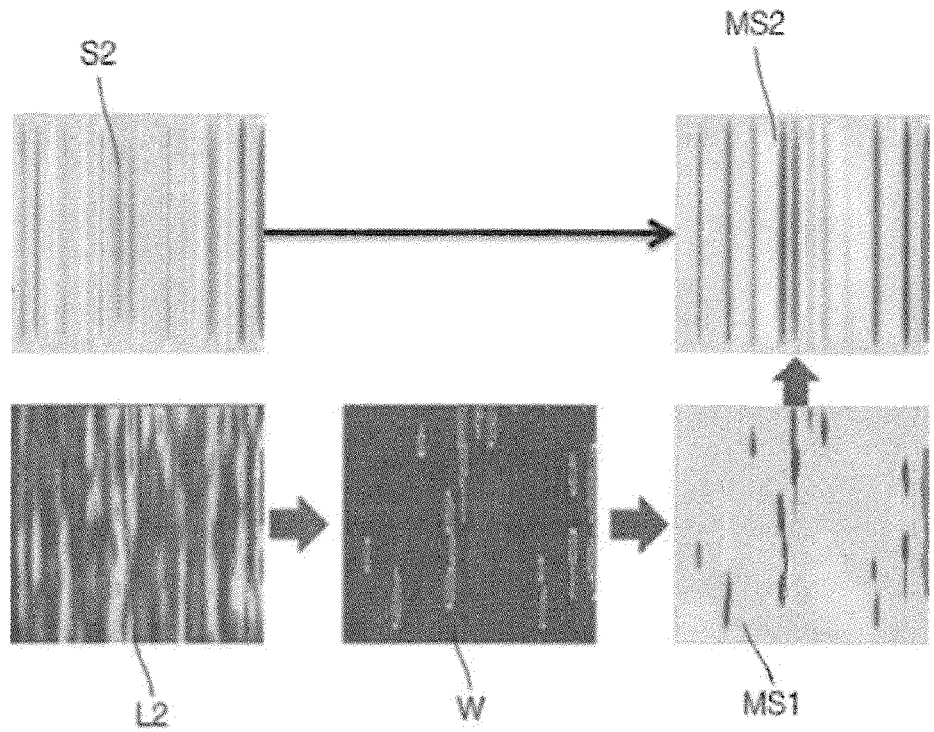

[Fig. 8]
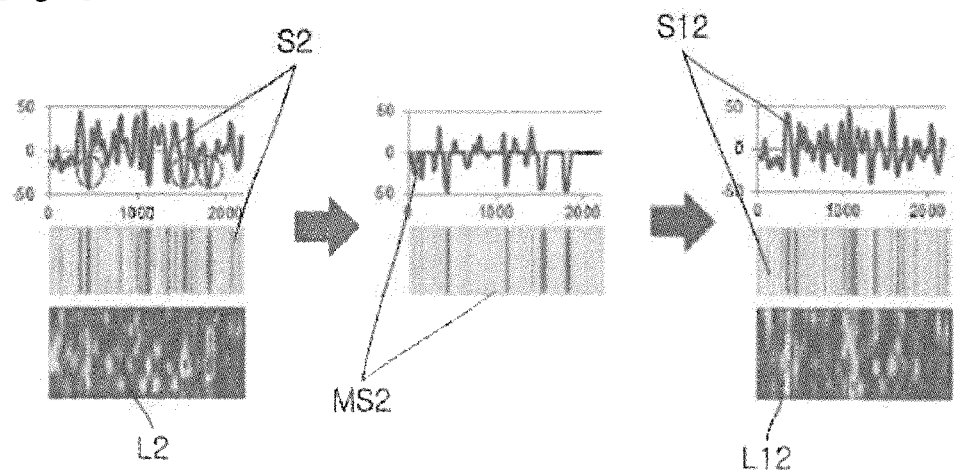
[Fig. 9]
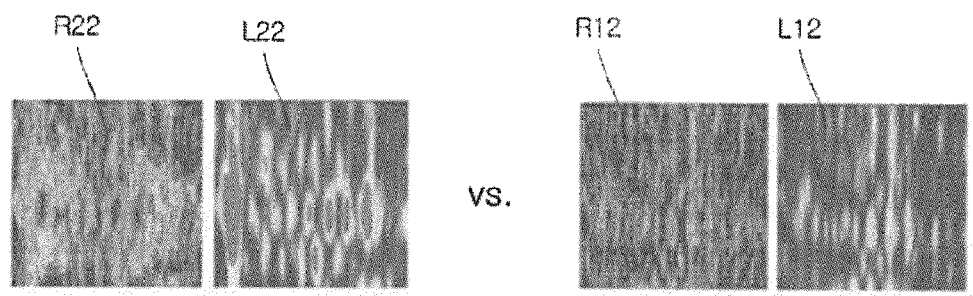

GLASS MANUFACTURING METHOD AND APPARATUS

CROSS-REFERENCE TO RELATED APPLICATIONS

This application claims the benefit of priority under 35 U.S.C. § 365 of International Patent Application Serial No. PCT/KR2017/005341 filed on May 23, 2017, designating the United States of America, which in turn claims the benefit of priority to Korean Patent Application Serial No. 10-2016-0063047 filed on May 23, 2016, the content of each are relied upon and incorporated herein by reference in its entirety.

TECHNICAL FIELD

The present disclosure related to a glass manufacturing method and apparatus to effectively improve the quality of the glass sheet by controlling stress in a glass sheet.

BACKGROUND ART

Liquid crystal displays (LCDs) are non-emissive display devices that are used with external light sources. An LCD is a device that may be configured to modulate incident polarized light beams emitted from external light sources. Liquid crystal (LC) material within the LCD modulates light by optically rotating the incident polarized light. The degree of rotation corresponds to the mechanical orientation of individual LC molecules within the LC material. The mechanical orientation of the LC material is readily controlled by the application of an external electrical field. This phenomenon is readily understood by considering a typical twisted nematic (TN) liquid crystal cell.

A typical TN liquid crystal cell includes two substrates and a layer of liquid crystal material disposed therebetween. Polarization films, oriented 90° to one another, are disposed on the outer surfaces of the substrates. When incident polarized light passes through the polarization film, it becomes linearly polarized in a first direction (e.g., a horizontal or vertical direction). With no electrical field applied, the LC molecules form a 90° spiral. When incident linearly polarized light traverses the liquid crystal cell, the light is rotated 90° by the liquid crystal material and is polarized in a second direction (e.g., a vertical or horizontal direction). Because the polarization of the light is rotated by the spiral to match the polarization of the second film, the second polarization film allows the light to pass therethrough. When an electrical field is applied across the liquid crystal layer, the alignment of the LC molecules is disrupted and incident polarized light is not rotated. Accordingly, incident polarized light is blocked by the second polarization film. The above described liquid crystal cell thus functions as a light valve controlled by the application of an electrical field. Those of ordinary skill in the art will also understand that, depending on the nature of the applied electrical field, the LC cell may also be operated as a variable light attenuator. An Active Matrix LCD (AMLCD) typically includes several million of the aforementioned LC cells in a matrix.

DISCLOSURE OF INVENTION

Technical Problem

A glass sheet is manufactured by forming a glass ribbon from molten glass, followed by cutting. A glass sheet produced in such a manner is commonly cut into smaller sheets to be used, for example, as a front glass substrate and a rear glass substrate of an LCD, as described above. Unfortunately, stress, which may be frozen into the parent glass sheets during manufacturing of the parent glass sheet, may result in distortion of the smaller sheets after the parent glass sheet is cut. This distortion is exacerbated as the size of the sheet is increased. Such distortion of the smaller sheets may cause light leakage in an LC panel fabricated therefrom leading to defects on a screen, for example, no color or white color locally appearing on the screen. In addition, the residual stress may cause a difference in dimensions between the front glass substrate and the rear glass substrate of an LCD.

Therefore, a method of reducing residual stress in glass sheets is required.

Solution to Problem

Various aspects of the present disclosure are intended to effectively improve the quality of glass sheets.

According to an aspect, a glass manufacturing method may include: a) determining a plurality of stress values in a glass sheet in a plurality of locations of the glass sheet respectively; b) determining a plurality of light leakage degrees in the plurality of locations respectively for a polarization-based display provided with the glass sheet, when the polarization-based display is in a state to block light transmissions; c) modifying the plurality of determined stress values based on the plurality of determined light leakage degrees; and d) manufacturing at least one additional glass sheet in a glass sheet manufacturing process while adjusting at least one process condition of the glass sheet manufacturing process based on the plurality of modified stress values.

According to another aspect, a glass manufacturing apparatus may include: a manufacturing apparatus configured to form a glass ribbon and then, separate a glass sheet from the glass ribbon, in a glass sheet manufacturing process; an adjusting apparatus configured to adjust at least one process condition of the glass manufacturing process; and a control device. The control device is configured to: determine a plurality of stress values in the glass sheet in a plurality of locations of the glass sheet respectively; determine a plurality of light leakage degrees in the plurality of locations respectively for a polarization-based display provided with the glass sheet, when the polarization-based display is in a state to block light transmission; modify the plurality of determined stress values based on the plurality of determined light leakage degrees; and control the adjusting device to adjust the at least one process condition based on the plurality of modified stress values.

Advantageous Effects of Invention

According to the present disclosure, it is possible to effectively improve the quality of glass sheets.

The methods and apparatuses of the present disclosure have other features and advantages that will be apparent from or that are set forth in greater detail in the accompanying drawings which are incorporated herein, and in the following Detailed Description, which together serve to explain certain principles of the present disclosure.

BRIEF DESCRIPTION OF DRAWINGS

FIG. 1 is a schematic illustration of an example glass manufacturing apparatus in accordance with aspects of the disclosure.

FIG. 2 is a sectional view of a forming vessel of the apparatus taken along line 2-2 of FIG. 1.

FIG. 3 schematically illustrates a glass ribbon being drawn off the forming vessel of FIG. 1.

FIG. 4 is a conceptual view of a device for measuring birefringence data of light passing through a glass sheet;

FIG. 5 schematically illustrates a method of obtaining light leakage degrees of a glass sheet;

FIG. 6 illustrates a map of stress values and a map of light leakage degrees of a glass sheet before modification;

FIG. 7 schematically illustrates a method of obtaining modified stress values in a glass sheet;

FIG. 8 schematically illustrates a result of adjusting a temperature distribution based on a modified stress values in an embodiment of the present disclosure; and FIG. 9 is an illustration comparing a result of adjusting temperature distribution based on a modified stress values in an embodiment of the present disclosure with a result of adjusting temperature distribution based on a stress values in a conventional method.

BEST MODE FOR CARRYING OUT THE INVENTION

Hereinafter, reference will be made in detail to exemplary embodiments of the present disclosure in detail, examples of which are illustrated in the accompanying drawings and described below, so that a person skilled in the art to which the present disclosure relates could easily put the present disclosure into practice.

Throughout this document, reference should be made to the drawings, in which the same reference numerals and symbols will be used throughout to designate the same or like components. In the following description, detailed descriptions of known functions and components incorporated herein will be omitted in the case that the subject matter of the present disclosure is rendered unclear by the inclusion thereof.

A glass manufacturing apparatus can be provided for manufacturing glass sheets. The glass manufacturing in the present disclosure may include a manufacturing apparatus, an adjusting apparatus and a control device. The manufacturing apparatus is configured to form a glass ribbon, and then, to separate at least one glass sheet from the glass ribbon, in a glass sheet manufacturing process. The manufacturing apparatus may include a fusion drawing apparatus 101 as discussed in further detail below with reference to FIGS. 1 to 3. The adjusting apparatus is configured to adjust at least one process condition of the glass manufacturing process. The adjusting apparatus may include a temperature adjusting apparatus 221 as discussed in further detail below with reference to FIGS. 2 and 3.

FIG. 1 schematically illustrates the fusion drawing apparatus 101 although up drawing, slot drawing, or other glass forming techniques may be used with aspects of the disclosure in further examples. With such fusion drawing process techniques, the present disclosure provides for at least periodic, such as continuous, thermal stress compensation of the glass ribbon by independently adjusting operations of a plurality of temperature adjusting elements. For instance, adjustments of power provided to the plurality of temperature adjusting elements can help control stress within the glass ribbon before the stress profile is frozen into the ribbon as the glass ribbon enters the elastic zone as discussed in further detail below. As such, by processing techniques of the present disclosure, fine tuning adjustments of the transverse stress profile can be achieved to avoid stress concentrations and/or resulting optical discontinuities.

As illustrated, the fusion drawing apparatus 101 can include a melting vessel 105 configured to receive batch material 107 from a storage bin 109. The batch material 107 can be introduced by a batch delivery device 111 powered by a motor 113. An optional controller 115 can be configured to activate the motor 113 to introduce a desired amount of batch material 107 into the melting vessel 105, as indicated by an arrow 117. A metal probe 119 can be used to measure a molten glass 121 level within a standpipe 123 and communicate the measured information to the controller 115 by way of a communication line 125.

The fusion drawing apparatus 101 can also include a fining vessel 127, such as a fining tube, located downstream of the melting vessel 105 and coupled to the melting vessel 105 by way of a first connecting tube 129. A mixing vessel 131, such as a stirring chamber, can also be located downstream of the fining vessel 127 and a delivery vessel 133 may be located downstream of the mixing vessel 131. As shown, a second connecting tube 135 can couple the fining vessel 127 to the mixing vessel 131 and a third connecting tube 137 can couple the mixing vessel 131 to the delivery vessel 133. As further illustrated, a downcomer 139 can be positioned to deliver molten glass 121 from the delivery vessel 133 to a drawing apparatus. A fusion drawing apparatus 101, including the illustrated fusion drawing machine 140, is configured to draw molten glass into a glass ribbon as discussed in further detail below. In one example, the fusion drawing machine 140 can include a forming vessel 143 provided with an inlet 141 to receive molten glass from the downcomer 139.

As shown, the melting vessel 105, fining vessel 127, the mixing vessel 131, delivery vessel 133, and forming vessel 143 are examples of molten glass stations that may be located in series along the fusion drawing apparatus 101.

FIG. 2 is a cross-sectional perspective view of the fusion drawing apparatus 101 taken along line 2-2 of FIG. 1. As shown, the forming vessel 143 includes a forming wedge 201 comprising a pair of downwardly inclined forming surface portions 203, 205 extending between opposing ends of the forming wedge 201. The pair of downwardly inclined forming surface portions 203, 205 converge in a drawing direction 207 to form a root 209. A drawing plane 211 extends through the root 209 wherein the glass ribbon 103 may be drawn in the drawing direction 207 along the drawing plane 211. As shown, the drawing plane 211 can bisect the root 209 although the drawing plane 211 may extend at other orientations with respect to the root 209.

The fusion drawing apparatus 101 for fusion drawing a glass ribbon can also include at least one edge roller assembly including a pair of edge rollers configured to engage a corresponding edge 103a, 103b of the glass ribbon 103 as the ribbon is drawn off the root 209 of the forming wedge 201. The pair of edge rollers facilitates proper finishing of the edges of the glass ribbon. Edge roller finishing provides desired edge characteristics and proper fusion of the edge portions of the molten glass being pulled off opposing surfaces of an edge director 212 associated with the pair of downwardly inclined forming surface portions 203 and 205. As shown in FIG. 2, a first edge roller assembly 213a is associated with the first edge 103a. FIG. 3 shows a second edge roller assembly 213b associated with the second edge 103b of the glass ribbon 103. Each edge roller assembly 213a, 213b can be substantially identical to one another although the pairs of edge rollers may have different characteristics in further examples. As shown in FIG. 1, once the edges 103a, 103b of the glass ribbon 103 are formed, a width "W" of the glass ribbon 103 is defined between the edges 103a and 103b in a direction substantially perpendicular to the drawing direction 207.

As shown in FIG. 3, the fusion drawing apparatus 101 can further include a first and second pull roll assembly 301a, 301b for each respective edge 103a, 103b to facilitate pulling of the glass ribbon 103 in the drawing direction 207 of the drawing plane 211.

The fusion drawing apparatus 101 can further include a cutting device 303 that allows the glass ribbon 103 to be cut into distinct glass sheets 305. The glass sheets 305 may be subdivided into individual glass sheets for incorporating in the various display devices, such as a liquid crystal display (LCD). Cutting devices may include laser devices, mechanical scoring devices, traveling anvil machines and/or other devices configured to cut the glass ribbon 103 into the distinct glass sheets 305.

Referring to FIG. 2, in one example, the molten glass 121 can flow into a trough 215 of the forming vessel 143. The molten glass 121 can then simultaneously flow over corresponding weirs 217a, 217b and downwardly over the outer surfaces 219a, 219b of the corresponding weirs 217a and 217b. Respective streams of molten glass then flow along the downwardly inclined forming surface portions 203 and 205 to the root 209 of the forming vessel 143, where the flows converge and fuse into the glass ribbon 103. The glass ribbon 103 is then drawn off the root 209 in the drawing plane 211 along drawing direction 207.

Turning to FIG. 3, the glass ribbon 103 is drawn from the root 209 in the drawing direction 207 of the drawing plane 211 from a viscous zone 307 to a setting zone 309. In the setting zone 309, the glass ribbon 103 is set from a viscous state to an elastic state having a desired cross-sectional profile. The glass ribbon is then drawn from the setting zone 309 to an elastic zone 311. In the elastic zone 311, the profile of the glass ribbon from the viscous zone 307 is frozen as a characteristic of the glass ribbon. While the set ribbon may be flexed away from this configuration, internal stress can cause the glass ribbon to bias back to the originally set profile.

As shown in FIGS. 2-3, any of the apparatus for producing glass ribbon 103 can include a temperature adjusting apparatus 221. For instance, as shown in FIG. 2, the temperature adjusting apparatus 221 can include a plurality of temperature adjusting elements 223 that can be positioned at respective lateral locations 225 along at least one temperature adjusting axis extending transverse, such as perpendicular, to the drawing direction 207.

As shown, the temperature adjusting apparatus 221 can provide the at least one axis as a first temperature adjusting axis 227a and a second temperature adjusting axis 227b, although a single or three or more temperature adjusting axes may be provided in further examples. As shown, the first and second temperature adjusting axis 227a, 227b can each comprise a substantially straight axis although curved or other axis shapes may be provided in further examples. Still further, the first and second axis 227a, 227b are substantially parallel to one another although the axes may be angled with respect to one another in further examples.

The temperature adjusting axis may be located in a wide variety of elevations with respect to the glass ribbon. For example, as shown in FIGS. 2 and 3, the first and second temperature adjusting axis 227a, 227b are located within the setting zone 309.

In addition, or alternatively, each or at least one temperature adjusting axis may be located within the viscous zone 307 and/or within the elastic zone 311 in further examples.

As mentioned previously, as shown in FIG. 2, the plurality of temperature adjusting elements 223 can be located in respective lateral locations 225, wherein the temperature adjusting elements are configured to adjust a transverse temperature profile of the glass ribbon 103 along the width "W" of the glass ribbon 103. As shown in FIG. 2, each of the plurality of temperature adjusting elements 223 on each temperature adjusting axis may be spaced apart from one another in series along the respective temperature adjusting axis. For example, as shown in FIG. 2, one of the temperature adjusting elements 223 may be located in a lateral location 225 that is a distance "L1" from the edge 103a of the glass ribbon 103 while the adjacent temperature adjusting element 223 can be located a distance "L2" from the edge 103a that is greater than the distance "L1". In some examples the temperature adjusting elements 223 can be equally spaced apart from one another along the width "W" of the glass ribbon. In some examples, the temperature adjusting elements may be located at different distances relative to the edges 103a, 103b of the glass ribbon. For example, the temperature adjusting elements 223 may be located closer together near the edges 103a and 103b when compared to a central region of the glass ribbon 103 to allow for a greater transfer of heat at the edges than in the central portion of the glass ribbon.

As shown, the temperature adjusting elements 223 can be spaced apart from one another in a single row although a matrix of temperature adjusting elements may be provided in further examples. As shown, the temperature adjusting elements 223 can also be substantially identical to one another although differently sized or different types of elements may be used in further examples. For instance, in one example, the temperature adjusting element size and/or type may be designed to allow greater heat transfer to the edges when compared to the central portion of the glass ribbon. In one example, the temperature adjusting elements 223 can comprise heating coils wherein heat is generated by electrical resistance from electrical current passing through the heating coils.

As also illustrated in FIG. 3, the glass manufacturing apparatus can further include a control device 323. The control device may include a controller 325 and a stress sensor apparatus 313. The control device 323 controls the adjusting device to adjust the at least one process condition.

The stress sensor apparatus 313 is configured to measure a stress characteristic of a glass sheet 305. The sensor elements 317 can comprise various configurations adapted to sense stress at a plurality of locations of the glass sheet 305. In one example, the stress sensor apparatus 313 may include a device configured to use polarized light to determine stress at the plurality of locations. With such examples, the polarized light can be used to determine the stress characteristic without destroying the glass sheet.

The control device 323 is configured for at least periodic, such as continuous, thermal stress compensation of the glass ribbon 103 by independently adjusting operations of the temperature adjusting elements 223 based on modified stress characteristic information of a glass sheet as discussed in further detail below.

The controller 325 can be in communication with the plurality of temperature adjusting elements 223 and the stress sensor apparatus 313. For example, as shown, the stress sensor apparatus 313 can be disposed to be in communication with the controller 325 by way of a communication line 329. Likewise, the plurality of temperature adjusting elements 223 associated with the temperature adjusting axes 227a, 227b can be disposed to be in communication with the controller 325 by way of respective communication lines 331, 333.

In one example, the control device 323 can comprise a database listing a relationship between power adjustments and corresponding impacts on a modified stress characteristic of a glass sheet. For example, the database can be based on a fixed listing of previous power adjustments and the corresponding observed impact on modified stress characteristic. In one example, the database is fixed, wherein the same database may be used for future power adjustments to compensate for modified stress within the glass ribbon. In further examples, the database may be dynamic, wherein the database may be updated over time to include new data. For example, the database may be configured to adapt the relationship between the power adjustments and the corresponding impact on the modified stress characteristic of the glass sheet based on the modified stress characteristic information after adjusting the operation of the temperature adjusting elements.

In other examples, the control device 323 can logically carry out power adjustments to minimize a modified stress characteristic of the glass ribbon 103. For example, a mathematical model of the relationships between temperature adjusting element power moves and resulting modified stress within the glass ribbon can be used to carry out the power adjustments.

In further examples, the control device 323 can optionally incorporate a fuzzy logic controller although other control devices may be used in further examples.

In some examples, the stress sensor apparatus 313 may be designed to periodically measure stress characteristic information of less than all of the glass sheets 305. Periodically measuring stress characteristic information in less than all of the glass sheets 305 may be desirable, for example, if the measurement process would damage or destroy the glass sheet. In such examples, a sufficient number of sheets may be periodically examined, as mentioned above, to accommodate changes in stress characteristic information while minimizing material waste due to destructive testing of the glass sheets. In one example, at least one glass sheet may be measured every 24 hours, such as every 4 hours, such as every hour. In further examples, at least one glass sheet out of 60 glass sheets may be measured, such as at least one glass sheet out of 240 glass sheets, such as at least one glass sheet out of 1440 glass sheets. In further examples, other percentages of glass sheets or times between measuring glass sheets may be selected based on the particular application.

A method for obtaining modified stress values of a glass sheet will now be described fully with reference to FIGS. 4 to 7. The method may include the steps: a) determining a plurality of stress values of a glass sheet in a plurality of locations of the glass sheet, respectively; b) determining a plurality of light leakage degrees in the respective plurality of locations for a polarization-based display provided with the glass sheet, when the polarization-based display is in a state to block light transmissions; and c) modifying the plurality of determined stress values based on the plurality of determined light leakage degrees.

FIG. 4 is a conceptual view of a device for measuring birefringence data of light passing through a glass sheet. As illustrated in FIG. 4, light emitted by a light source 11 passes through a 45° linear polarizer 12 and then a 0° photo elasticity modulator 13. During passage through the 0° photo elasticity modulator 13, the phase of the light changes depending on the frequency of light. The phase-changed light passes through a glass sample 14, during which the polarization of the light is changed depending on the internal stress of the glass sample 14. One portion of the polarization-changed light passes through a mirror 15 and a −45° linear polarizer 16 before the luminance thereof is measured by a first luminance sensor (photodiode) 17. The other portion of the polarization-changed light is reflected from the mirror 15 to pass through a 0° linear polarizer 18 before the luminance thereof is measured by a second luminance sensor (photodiode) 19. The retardation and azimuthal angle of the light are calculated from the measured luminance values using Mueller matrices. It will be apparent to a person skilled in the art that the retardation and the azimuthal angle of light according to the present embodiment are not required to be measured using only the device illustrated in FIG. 4. Rather, FIG. 4 is merely an example illustrating an exemplary method for measuring the retardation and the azimuthal angle of light of a glass sheet, and the retardation and the azimuthal angle may be measured using other known methods.

Stress values in a glass sheet may be obtained by measuring the retardation and the azimuthal angles of transmitted light occurring due to the stress when the light passes through the glass sheet and converting the retardations and the azimuthal angles to the stress values.

First, the retardation and the azimuthal angle θ of the light passing through the glass sheet are obtained at a plurality of locations of the glass sheet.

Formula 1 below represents a relationship between a retardation of light and principal stress. A difference between the principal stress values can be calculated using Formula 1 below.

[Math.1]

$$\sigma_1 - \sigma_2 (\text{psi}) = \frac{\text{Retardation(nm)}}{[K * \text{thickness(cm)} * SOC(\text{nm/sm/psi})]} \quad (1)$$

A stress component $\tau_{xy}$ is calculated using Formula 2 below.

[Math.2]

$$\tau_{xy} = \frac{1}{2}(\sigma_1 - \sigma_2)\sin(2\theta) \quad (2)$$

Stress components $\sigma_{xx}$ and $\sigma_{yy}$ are can be calculated using $\tau_{xy}$ from a partial differential equation of Formula 3 below.

[Math.3]

$$\frac{\partial \sigma_{xx}}{\partial x} + \frac{\partial \tau_{xy}}{\partial y} = 0, \frac{\partial \sigma_{yy}}{\partial y} + \frac{\partial \tau_{xy}}{\partial x} = 0 \quad (3)$$

Most residual stress formed by temperature differences is $\sigma_{yy}$ acting in y direction with respect to a plane perpendicular to the y direction, stress control may be performed mainly on $\sigma_{yy}$.

The glass sheet according to the present embodiment can be fabricated by a drawing process (a down-drawing process, a up-drawing process or the like). Here, the longitudinal direction of the glass sheet (the y direction) refers to the drawing direction in the drawing process rather than simply to a vertical direction. For example, in a down-drawing or fusion process, the longitudinal direction of the glass sheet (y direction) is a vertical direction, while the transverse direction of the glass sheet (x direction) is a horizontal direction. Further, in a float process, the longitudinal direction of the glass sheet is a horizontal direction.

FIG. 5 schematically illustrates a method of obtaining a plurality of light leakage degrees L2 of a glass sheet. With reference to FIG. 5, when an electrical field is applied to an LC layer as described above, theoretically, no light from a backlight can pass through the LC panel. However, in practice, smaller cut sheets may be subjected to distortion due to the stress of a glass sheet, and light leakage may be caused by this distortion.

A "light leakage degree" indicates an amount of light passing through an LC panel, when the LC panel is in a state in which light transmissions are blocked. This light leakage degree can be determined physically or by converting the retardation data R1 and azimuthal angle data to a light leakage degree.

A light leakage degree in the polarization condition of a TN panel is expressed by Formula 4 below.

[Math. 4]

$$\text{Light leakage degree} = 2\sin^2(\theta)\cos^2(\theta)(1-\cos(\text{Retardation})) \quad (4)$$

Suitable measurements may be used to remove noise, which otherwise may be included in the plurality of light leakage degrees L2. For example, first, a plurality of light leakage degrees L1 in a set of locations are determined by converting retardation data R1 and azimuthal angle data into a light leakage degree L1. Then, an average value of the light leakage degree of the glass sheet in each location and in adjacent locations is determined, and the average value is designated as the light leakage degree L2 for each location. For example, as illustrated in FIG. 2, an average value of the light leakage degree L1 at a center point within a nine point moving window 21 and the light leakage degrees L1 at eight adjacent points surrounding the center point may be determined to be the light leakage degree L2 at the center point.

FIG. 6 illustrates a map of stress values S2 and a map of light leakage degrees L2 of a glass sheet before modification.

With reference to FIG. 6, stress values S2 in each array of locations along a single longitudinal line may be assumed to be the same, the longitudinal line being a conceptual line extending in the longitudinal direction of the glass sheet. In some embodiments, the stress values in the glass sheet in each array of locations on the longitudinal line can be obtained, and an average value of these stress values can then be correlated as stress values S2 for each array of locations.

In some embodiments, a degree of light leakage in a specific location may not be proportional to a value of stress in the specific location. Thus, it may be ineffective to simply control all values of stress in the glass sheet, regardless of light leakage. Rather, it may be more effective in improving the quality of the glass sheet to selectively control amounts of stress inducing a large amount of light leakage. In some embodiments, a transverse temperature profile along the width of a glass ribbon may be adjusted to selectively control and thereby, reduce such amounts of stress, which induce a large amount of light leakage without controlling other stress, which merely induce a small amount of light leakage, as described in detail above.

Some reasons for light leakage in a glass sheet manufactured by down-drawing, float or other glass processing may include the generation of stress due to horizontal or vertical, as the case may be, temperature difference and the generation of stress due to temperature differences physically induced by external force. For example, theoretically, in down-drawing processing, a thermal history should be the same in the vertical direction (the longitudinal direction of the glass sheet), or the drawing direction. Thus, some embodiments described herein can control stress due to the temperature difference in the horizontal direction (the transverse direction of the glass sheet) by automatically controlling a horizontal temperature profile in a sheet forming zone. In actual fabrication sites, however, localized temperature differences can be caused by sheet movements and flow changes within facilities. Thus, values of stress in the vertical direction may not be uniform, and high values of stress in the form of islands may be concentrated in localized areas.

Conventionally, in the process of fabricating glass sheets, horizontal temperatures can be adjusted based on a stress ($\sigma_{yy}$) profile S2. However, when ellipses drawn with dotted lines in FIG. 6 are compared, it can be observed that a low value of $\sigma_{yy}$ may be exhibited in a location exhibiting a high degree of light leakage. Thus, using conventional practice, the effect of improving degrees of light leakage may be insignificant.

In some embodiments, to address localized high degrees of light leakage, the $\sigma_{yy}$ profile may be modified by assigning weights to the $\sigma_{yy}$ profile according to degrees of light leakage, and then, the modified $\sigma_{yy}$ profile may be controlled, whereby the effect of reducing degrees of light leakage can be improved.

FIG. 7 schematically illustrates a method of obtaining average modified stress values MS2 in a glass sheet. With reference to FIG. 7, some embodiments may provide data filtering and processing schemes to reduce island-shaped localized concentrations of light leakage caused by external influences and changes in process in down-drawing processing.

By way of example, before-averaging modified stress values MS1 can be obtained by assigning different weights W as a function of degrees of light leakage L2, to values of stress S2. For example, a certain degree of light leakage among degrees of light leakage L2 can be set as a threshold. A location in which a degree of light leakage L2 is lower than the threshold would be assigned a weight W of 0, and a location in which a degree of light leakage L2 is equal to or greater than the threshold would be assigned a weight W of 1. Before-averaging modified stress values MS1 may then be obtained by multiplying values of stress S2 by appropriate weights W.

In other embodiments, a location in which a degree of light leakage L2 is lower than the threshold can be assigned a weight W of 0, and a location in which a degree of light leakage L2 is equal to or greater than the threshold can be assigned a weight W proportional to the degree of light leakage L2. Before-averaging modified stress values MS1 may then be obtained by multiplying values of stress S2 by appropriate weights W.

After these before-averaging modified values of stress MS1 in the glass sheet are obtained, average modified stress values MS2 may be obtained by calculating average values of the before-averaging modified values MS1 in locations on respective longitudinal lines. When the process of fabricating glass sheets is modified based on the modified values of stress MS2, stress control in an area having high degrees of light leakage can be more effectively performed. This can be used to reduce concentrations of light leakage.

A method of adjusting temperature distribution based on the modified stress values will now be described in detail with reference FIGS. 8 and 9.

FIG. 8 schematically illustrates a result of adjusting temperature distribution based on a modified stress values MS2 in an embodiment of the present disclosure, the modified stress being obtained using the method of FIG. 7 and described above. With reference to FIG. 8, the left images illustrate a map of stress S2 and a map of degrees of light leakage L2 prior to modification, the central images illustrate a map of modified stress MS2, and the right images illustrate a map of stress S12 and a map of degrees of light leakage L12 in a glass sheet fabricated according to the embodiments described herein.

As can be observed in FIG. 8, a stress profile S12 can be significantly decreased in locations exhibiting high degrees of light leakage L12 after the stress MS2 related to high degrees of light leakage is appropriately controlled.

Examples

Evaluations were performed to test some embodiments of reducing degrees of light leakage. As will be apparent from Table 1 below, an application of exemplary methods described herein can significantly reduce the average and distribution of maximum degrees of light leakage L12 in glass sheets fabricated in two glass sheet fabrication lines for several weeks whereas conventional stress control methods had a limited ability to reduce island-shaped localized concentrations of light leakage L22. Using exemplary embodiments, it was possible to significantly reduce concentrations of light leakage L12 by obtaining stress profiles MS2 based on degrees of light leakage L12 developed and applying the stress profile MS2 to the control of light leakage.

TABLE 1

| Fabrication Processing Line | Average of maximum degrees of light leakage | | | Distribution of maximum degrees of light leakage | | |
|---|---|---|---|---|---|---|
| | Before | After | Improved | Before | After | Improved |
| 1 | $2.32 * 10^{-5}$ | $1.19 * 10^{-5}$ | 49% | 1.32 | 0.25 | 81% |
| 2 | $1.54 * 10^{-5}$ | $1.08 * 10^{-5}$ | 29% | 0.41 | 0.22 | 46% |

FIG. 9 is an illustration comparing a result of adjusting temperature distribution based on modified stress values MS2 in an embodiment of the present disclosure with a result of adjusting temperature distribution based on a stress values S2 in a conventional method. As illustrated FIG. 9, a light retardation map R22 (maximum retardation of light: 1.26) and a light leakage degree map L22 (maximum light leakage degree: $2.91*10-5$) of a glass substrate manufactured by the prior-art stress control method is compared to a light retardation map R12 (maximum retardation of light: 0.84) and a light leakage degree map L12 (maximum light leakage degree: $0.80*10-5$) of a sample glass substrate manufactured by applying the stress control method according to the present embodiment to the processing line 1 in Table 1. It can be observed that although conventional stress control methods have a limited ability to reduce island-shaped localized concentrations of light leakage, exemplary embodiments were able to significantly reduce island-shaped localized concentrations of light leakage.

The methods mentioned in the present disclosure are applicable not only to glass sheets for display devices, such as liquid crystal displays (LCDs) and organic lightemitting diodes (OLEDs), but also to a variety of other glass sheets. The method can be useful for glass sheets, the distortion of which can influence the quality of final products. Although the following reference will be made to light leakage in liquid crystal (LC) panels, it should be understood that the purpose of the present disclosure is not limited to the improvement of such degrees of light leakage, as degrees of light leakage are merely used as an index for visually representing the quality of glass sheets.

The foregoing descriptions of specific exemplary embodiments of the present disclosure have been presented with respect to the drawings. They are not intended to be exhaustive or to limit the present disclosure to the precise forms disclosed, and obviously many modifications and variations are possible for a person having ordinary skill in the art in light of the above teachings.

It is intended therefore that the scope of the present disclosure not be limited to the foregoing embodiments, but be defined by the Claims appended hereto and their equivalents.

What is claimed is:

1. A glass manufacturing method comprising:
   a) determining a plurality of stress values in a glass sheet in a plurality of locations of the glass sheet respectively;
   b) determining a plurality of light leakage degrees in the plurality of locations respectively for a polarization-based display provided with the glass sheet when the polarization-based display is in a state to block light transmissions;
   c) calculating a plurality of modified stress values based on a product of the plurality of determined stress values and corresponding assigned weights, the weight for each location varying depending on the determined light leakage degree in each location, wherein the modified stress value at each location varies depending on the corresponding determined light leakage degree of the plurality of light leakage degrees at the corresponding location through the dependence of the weight on the corresponding light leakage degree of the plurality of light leakage degrees; and
   d) manufacturing at least one additional glass sheet in a glass sheet manufacturing process while adjusting at least one process condition of the glass sheet manufacturing process based on the plurality of modified stress values, wherein the glass sheet manufacturing process comprises a drawing process in which a glass ribbon is drawn and then, cut into the at least one additional glass sheet, and the at least one process condition comprises a transverse temperature profile along a width of the glass ribbon, the width extending transverse to a drawing direction in the drawing process, and a longitudinal direction of the glass sheet is a drawing direction in the drawing process.

2. The method of claim 1, wherein the plurality of locations comprise a plurality of arrays of locations, and each array of locations arranged in the longitudinal direction of the glass sheet.

3. The method of claim 2, wherein step a) further comprises calculating an average of the stress values in each array of locations; and
   wherein step c) calculates the plurality of modified stress values using the average for each array of locations as the determined stress values at each array of locations.

4. The method of claim 1, wherein each of the plurality of stress values comprises a value of a stress component in the longitudinal direction of the glass sheet.

5. The method of claim 1, wherein the plurality of locations comprise a plurality of arrays of locations, each array of locations arranged in the longitudinal direction of the glass sheet,
wherein step c) comprises:
modifying the determined stress values in each array of locations into before-averaging modified stress values;
calculating an average of the before-averaging modified stress values in each array of locations; and
wherein step d) adjusts the at least one process condition using the average for each array of locations as the modified stress values at each array of locations.

6. The method of claim 1, wherein step b) further comprises calculating an average of the light leakage degrees in each location, the average of the light leakage degrees at a location is based on the corresponding location and at least one adjacent location adjacent to the corresponding location; and wherein step c) performs the modification using the average for each location as the determined light leakage degree in each location.

7. The method of claim 1, wherein step a) comprises:
b1) obtaining birefringence data in the plurality of locations of the glass sheet, and
b2) determining the plurality of stress values from the birefringence data.

8. The method of claim 7, wherein the birefringence data comprise retardation data and azimuthal angle data in the plurality of locations of the glass sheet.

9. The method of claim 1, wherein step b) comprises:
b1) obtaining birefringence data in the plurality of locations of the glass sheet, and
b2) determining the plurality of light leakage degrees from the birefringence data.

10. The method of claim 1, wherein the polarization-based display is a twisted nematic display.

11. The method of claim 1, wherein the calculating a plurality of modified stress values comprises multiplying the stress value in each location by the weight for each location.

12. The method of claim 1, wherein, when any two locations of the plurality of locations in which the light leakage degrees are different such that the light leakage degree in one location of the any two locations is greater than the light leakage degree in the other location of the any two locations are compared, the weight for the one location is greater than or equal to the weight for the other location.

13. The method of claim 12, wherein, when the light leakage degree in the one location is greater than or equal to a predetermined threshold and the light leakage degree in the other location is lower than the predetermined threshold, the weight in the one location is greater than the weight for the other location.

14. The method of claim 13, wherein the weight in the one location is proportional to the light leakage degree in the one location and the weight for the other location is 0.

15. The method of claim 1, wherein step d) adjusts the transverse temperature profile by independently adjusting operation of a plurality of temperature adjusting elements positioned along the width of the glass ribbon.

16. The method of claim 15, wherein step d) independently adjusts powers provided to the plurality of temperature adjusting elements respectively.

17. The method of claim 1, wherein step d) controls the plurality of modified stress values in the at least one additional glass sheet by adjusting the at least one process condition for the at least one additional glass sheet.

18. The method of claim 1, further comprising the step of:
e) repeating steps a) to d).

19. A glass manufacturing apparatus comprising:
a manufacturing apparatus configured to form a glass ribbon and then, separate a glass sheet from the glass ribbon, in a glass sheet manufacturing process;
an adjusting apparatus configured to adjust at least one process condition of the glass manufacturing process; and
a control device configured to:
determine a plurality of stress values in the glass sheet in a plurality of locations of the glass sheet respectively;
determine a plurality of light leakage degrees in the plurality of locations respectively for a polarization-based display provided with the glass sheet, when the polarization-based display is in a state to block light transmission;
calculate a plurality of modified stress values based on a product of the plurality of determined stress values and corresponding assigned weights, the weight for each location varying depending on the determined light leakage degree in each location, wherein the modified stress value at each location varies depending on the corresponding determined light leakage degree of the plurality of light leakage degrees at the corresponding location through the dependence of the weight on the corresponding light leakage degree of the plurality of light leakage degrees; and
control the adjusting device to adjust the at least one process condition based on the plurality of modified stress values.

20. The adjusting apparatus of claim 19, wherein the adjusting apparatus comprises a plurality of temperature adjusting elements positioned at respective lateral locations along at least one temperature adjusting axis perpendicular to a drawing direction.

21. The glass manufacturing apparatus of claim 19, further comprising a cutting device configured to cut the glass ribbon into distinct glass sheets.

* * * * *

UNITED STATES PATENT AND TRADEMARK OFFICE
CERTIFICATE OF CORRECTION

| | | |
|---|---|---|
| PATENT NO. | : 11,130,697 B2 | Page 1 of 1 |
| APPLICATION NO. | : 16/302943 | |
| DATED | : September 28, 2021 | |
| INVENTOR(S) | : Myunghwan Oh et al. | |

It is certified that error appears in the above-identified patent and that said Letters Patent is hereby corrected as shown below:

On the Title Page

In Column 1, item (73), Assignee, Line 1, delete "Coming," and insert -- Corning, --, therefor.

Signed and Sealed this
Twenty-third Day of November, 2021

Drew Hirshfeld
*Performing the Functions and Duties of the
Under Secretary of Commerce for Intellectual Property and
Director of the United States Patent and Trademark Office*